United States Patent [19]
Merminod et al.

[11] Patent Number: 6,157,369
[45] Date of Patent: Dec. 5, 2000

[54] OPTICAL-MECHANICAL ROLLER WITH RATCHET

[75] Inventors: Antoine A. Merminod, Cully; Marc A. Bidiville, Pully, both of Switzerland; Ting Hu Chang, Hsinchu, Taiwan

[73] Assignee: Logitech, Inc., Fremont, Calif.

[21] Appl. No.: 08/949,681

[22] Filed: Oct. 14, 1997

[51] Int. Cl.$^7$ ............................................ G09G 5/08
[52] U.S. Cl. ........................ 345/157; 345/165; 345/166
[58] Field of Search ................................ 345/157–166, 345/167, 168

[56] References Cited

U.S. PATENT DOCUMENTS

| | | |
|---|---|---|
| 4,464,652 | 8/1984 | Lapson et al. . |
| 4,712,101 | 12/1987 | Culver ........................................ 340/710 |
| 4,928,093 | 5/1990 | Rahman . |
| 4,952,919 | 8/1990 | Nippoldt . |
| 4,982,618 | 1/1991 | Culver ........................................ 345/167 |
| 5,095,303 | 3/1992 | Clark et al. ................................ 340/710 |
| 5,161,313 | 11/1992 | Rijlaarsadarm . |
| 5,298,919 | 3/1994 | Chang ........................................ 345/163 |
| 5,313,230 | 5/1994 | Venolia et al. ............................. 345/163 |
| 5,473,344 | 12/1995 | Bacon et al. .............................. 345/163 |
| 5,479,192 | 12/1995 | Carroll, Jr. et al. ....................... 345/168 |
| 5,488,392 | 1/1996 | Harris ........................................ 345/157 |
| 5,493,314 | 2/1996 | Rowe ........................................ 345/156 |
| 5,557,440 | 9/1996 | Hanson et al. . |
| 5,694,153 | 12/1997 | Aoyagi et al. ............................ 345/161 |
| 5,699,083 | 12/1997 | Lo .............................................. 345/165 |
| 5,712,725 | 1/1998 | Faltermeier et al. . |
| 5,717,427 | 2/1998 | Lin ............................................. 345/163 |
| 5,771,038 | 6/1998 | Wang ......................................... 345/163 |
| 5,790,098 | 8/1998 | Lin ............................................. 345/164 |
| 5,828,364 | 10/1998 | Siddiqui ................................... 345/163 |
| 5,912,661 | 6/1999 | Siddiqui ................................... 345/166 |

FOREIGN PATENT DOCUMENTS

| | | |
|---|---|---|
| 0531829A1 | 3/1993 | European Pat. Off. ............ H03J 9/06 |
| 3610501A1 | 10/1986 | Germany . |
| 44 05 314 C1 | 6/1995 | Germany . |
| 296 17 123 U1 | 10/1996 | Germany . |
| 297 01 466 U1 | 1/1997 | Germany . |
| 297 16 184 U1 | 9/1997 | Germany . |
| 60-175137 | 9/1985 | Japan . |
| 63-216224 | 9/1988 | Japan . |
| 3-90338 | 9/1991 | Japan . |
| 4-186417 | 7/1992 | Japan . |
| 5-113852 | 5/1993 | Japan . |
| 5-55431 | 7/1993 | Japan . |
| 6-250781 | 9/1994 | Japan . |
| 10-149745 | 11/1996 | Japan . |
| 10-177831 | 12/1996 | Japan . |
| 3039992 | 1/1997 | Japan . |
| 10-326144 | 5/1997 | Japan . |
| 10-340158 | 6/1997 | Japan . |
| 3050051 | 12/1997 | Japan . |
| 63-19935 | 12/1998 | Japan . |
| 095299 | 1/1988 | Taiwan . |
| 148492 | 12/1990 | Taiwan . |
| 220410 | 10/1991 | Taiwan . |
| 210764 | 8/1993 | Taiwan . |
| 220410 | 2/1994 | Taiwan . |
| 264074 | 2/1994 | Taiwan . |
| 308680 | 3/1996 | Taiwan . |
| 278078 | 6/1996 | Taiwan . |
| 281325 | 7/1996 | Taiwan . |
| 315011 | 12/1996 | Taiwan . |
| 207518 | 2/1997 | Taiwan . |
| 316696 | 3/1997 | Taiwan . |
| 2 309 507 | 1/1996 | United Kingdom . |
| 2 321 692 | 1/1997 | United Kingdom . |

*Primary Examiner*—Richard A. Hjerpe
*Assistant Examiner*—Kimnhung Nguyen
*Attorney, Agent, or Firm*—Townsend and Townsend and Crew LLP

[57] ABSTRACT

A pointing device, such as a mouse, track ball or joystick, having a roller. The roller itself has either a plurality of slits or reflective strips for optical detection. A photoemitter and photodetector are positioned to detect rotation of the roller. Thus, the present invention eliminates the need for coupling to a separate optical encoder. The roller can be depressed to cause the actuation of a microswitch. In a preferred embodiment, the photoemitter and photodetector are aligned along a vertical axis, such that the position information is not affected by the vertical depressing of the roller.

14 Claims, 6 Drawing Sheets

PRIOR ART

OPTICAL-MECHANICAL ROLLER WITH RATCHET

BACKGROUND OF THE INVENTION

The present invention relates to computer mice or track balls, and in particular to those including a roller.

In one type of computer mouse, a ball protrudes from the bottom of the mouse housing, and rolls across a supporting surface. The movement of the ball is typically detected by shafts which are in contact with the ball and turn an encoder wheel having a number of slots. An LED is on one side of the encoder wheel, and a detector on the other, so that the turning of a encoder wheel, corresponding to the movement of the ball in one direction, can be detected by the intensity of light when it shines through a slot, and is subsequently blocked between slots. Track balls will have a ball mounted on the top with the housing being stationary, but similarly operate with two encoder wheels at 90° angles to detect X and Y movement. Optical mice and trackballs have also been developed.

Such mice and track balls typically also have buttons which can be depressed or clicked by a user, and which depress a microswitch. These provide additional inputs to the computer, in addition to the position of the mouse or trackball. Some mouse designs have added a roller which can be used for such functions as scrolling or zooming. The roller is operated by a user finger much like a dial on a radio.

One roller design is shown in U.S. Pat. No. 5,298,919 assigned to Multipoint Technology Corporation. This has a user operable roller which has a shaft extending out from it, and an encoder wheel attached to the shaft. The encoder wheel is like the optical encoders used on the mice or trackball balls. Microsoft U.S. Pat. No. 5,473,344 shows a design similar to the Multipoint one in which a shaft from the roller is connected to a separate optical encoder wheel.

Another design is shown in U.S. Pat. No. 5,313,230 assigned to Apple Computer. This shows two finger rollers with a shaft which drives a belt which is connected to a pulley on a separate encoder. A similar pulley system is shown in U.S. Pat. No. 5,530,455 assigned to Mouse Systems.

Yet another design is shown in U.S. Pat. No. 5,446,481 assigned to Mouse Systems. In this design, the roller has a shaft attached to a gear outside the roller, which drives an optical encoder wheel with the gear.

Figure 5:
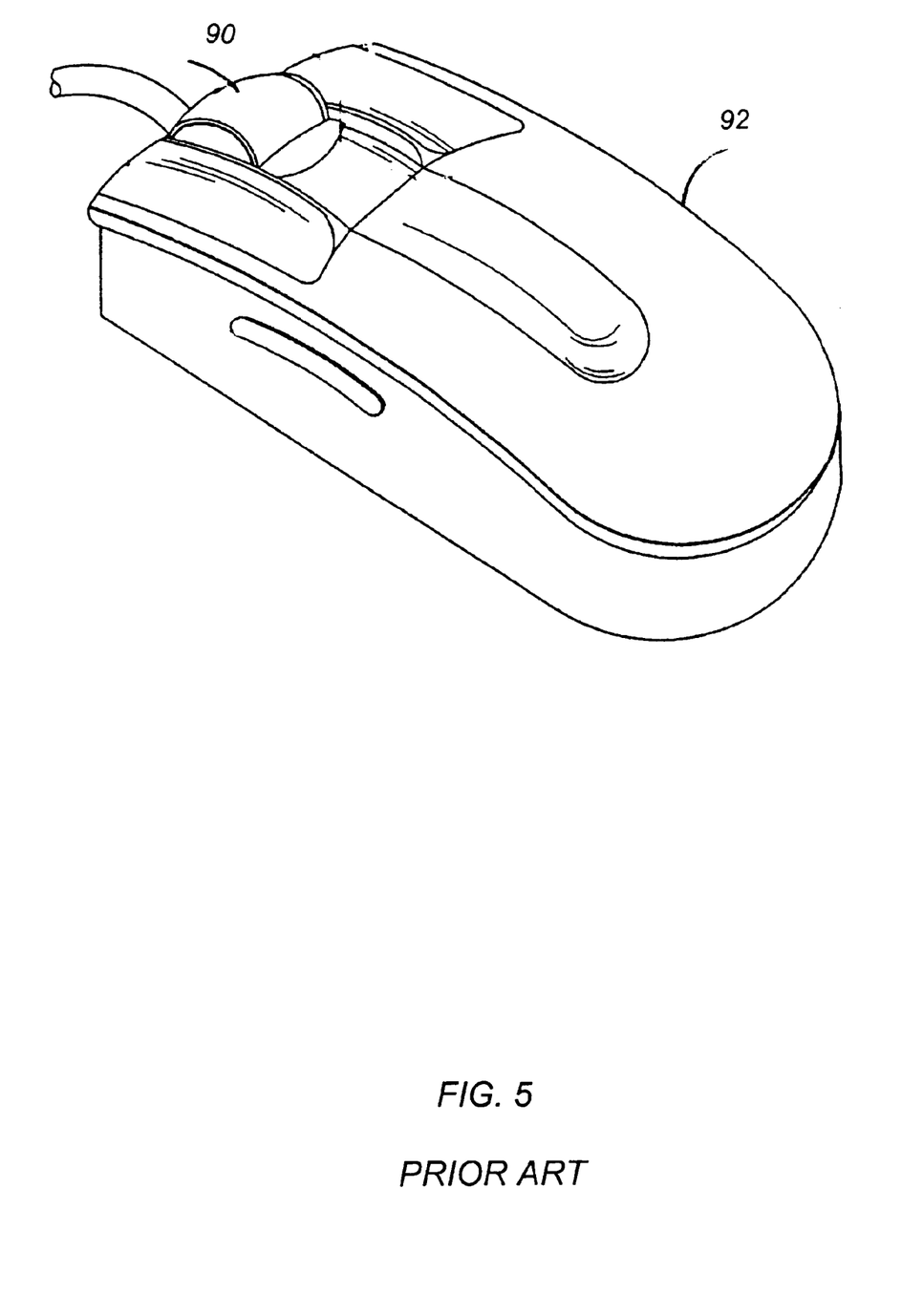
FIG. 5 is a diagram of a prior art mouse showing the mouse housing and roller extending through the housing.

In addition to the rollers being turnable, a number of designs allow the roller itself to actuate a switch. In Microsoft U.S. Pat. No. 5,473,344, this is done with a roller which pivots inward under pressure from the finger, in addition to rolling about its axis. When pivoted inward, it will depress a microswitch to send an activation signal to the computer. Mouse Systems U.S. Pat. No. 5,530,455 shows a design in which the entire housing for the roller is depressed against supporting springs, and when depressed actuates an underlying microswitch. FIG. 5 is a drawing of the mouse of the Mouse Systems patent showing the housing 92 and roller 90.

U.S. Pat. No. 5,095,303 to Apple Computer shows a graphic controller with three dials, with at least one of the dials shown with an encoder ring and detectors, with the detectors being shown on either side of the dial in one drawing. However, unlike some of the designs discussed above, the dials are on a fixed axis and cannot be depressed to actuate a microswitch and provide another input signal.

SUMMARY OF THE INVENTION

The present invention provides a pointing device, such as a mouse, track ball or joystick, having a roller. The roller itself has either a plurality of slits or reflective strips for optical detection. A photoemitter and photodetector are positioned to detect rotation of the roller. Thus, the present invention eliminates the need for coupling to a separate optical encoder.

In yet another aspect of the present invention, the roller design provides a mechanical, ratchet feel as feedback to the user. This is done by providing an undulating or sawtooth-type surface inside the rim of the roller. A second roller is biased against this surface with a spring, so that when the larger roller rotates, it clicks from one depression to the next against the inside roller. In a preferred embodiment, the same spring both biases the roller against the inside surface, thus supporting the larger roller, and also is used to activate a microswitch when the entire roller is depressed.

For a fuller understanding of the nature and advantages of the invention, reference should be made to the following description taken in conjunction with the accompanying drawings.

DETAILED DESCRIPTION OF THE PREFERRED EMBODIMENTS

Figure 1:
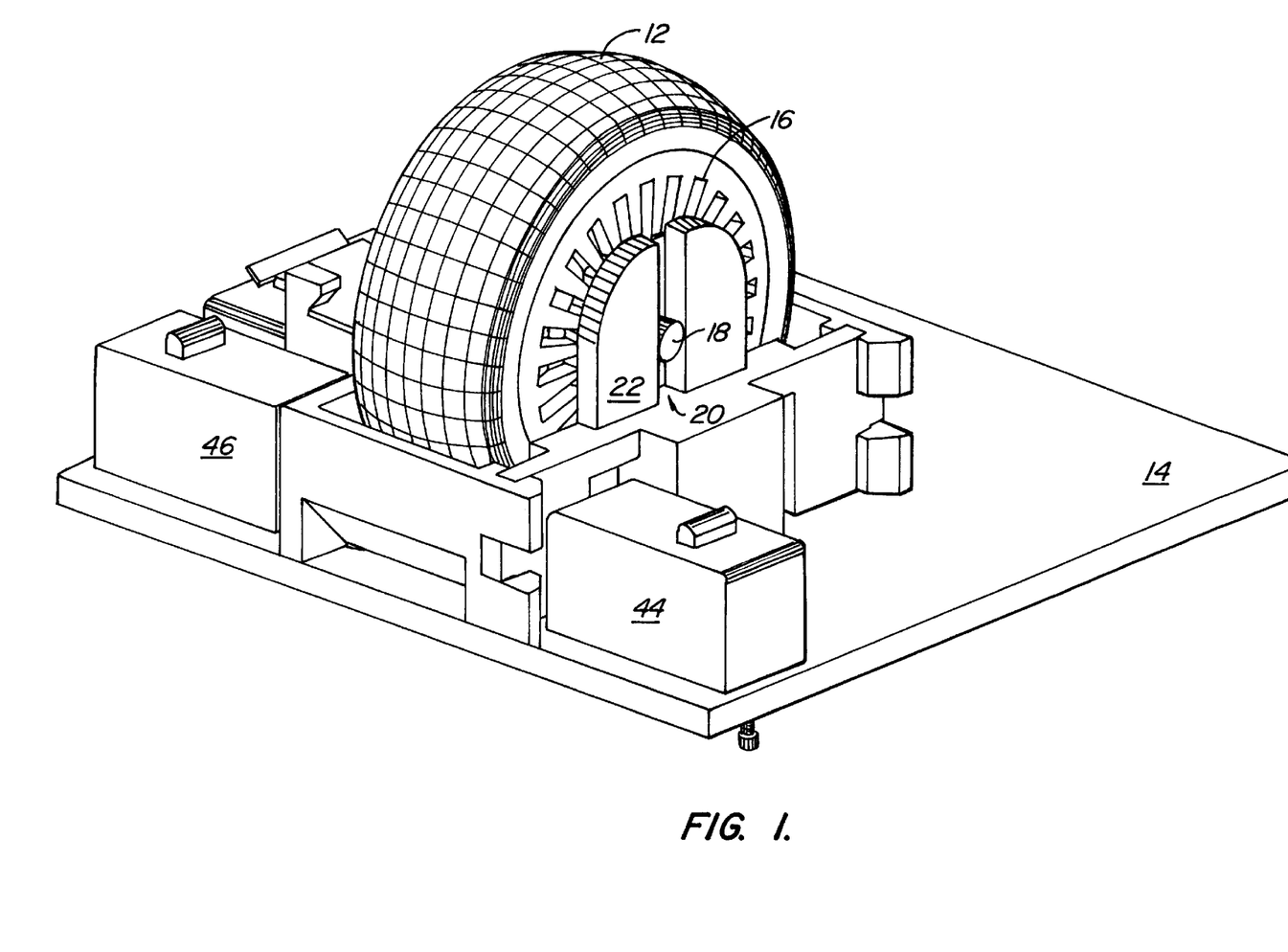
FIG. 1 is a perspective view of a roller according to the present invention.

FIG. 1 illustrates a roller 12 mounted over a substrate 14 which can be, itself, mounted inside of a mouse, trackball, or joystick housing, with roller 12 extending out through a slot in the housing for user actuation. The roller has a number of slits 16 which are elongated and extend radially. The number of slits can vary from six to forty-eight, or even more. Preferably, the number of slits is ¼ the number of ratchets of the roller, or a multiple thereof. By incorporating the slits into the roller body itself, the need for a coupling mechanism to a separate encoder wheel is eliminated.

Additionally, roller 12 can move up and down. Roller 12 rotates about an inner roller (not shown in this view) which rotates about an axle 18. Axle 18 is mounted in a slot 20 in a support structure 22. By aligning the emitter and detector along the vertical axis even with slot 20, the up and down movement of the roller will not effect the detection of the rotational movement.

Figure 2:
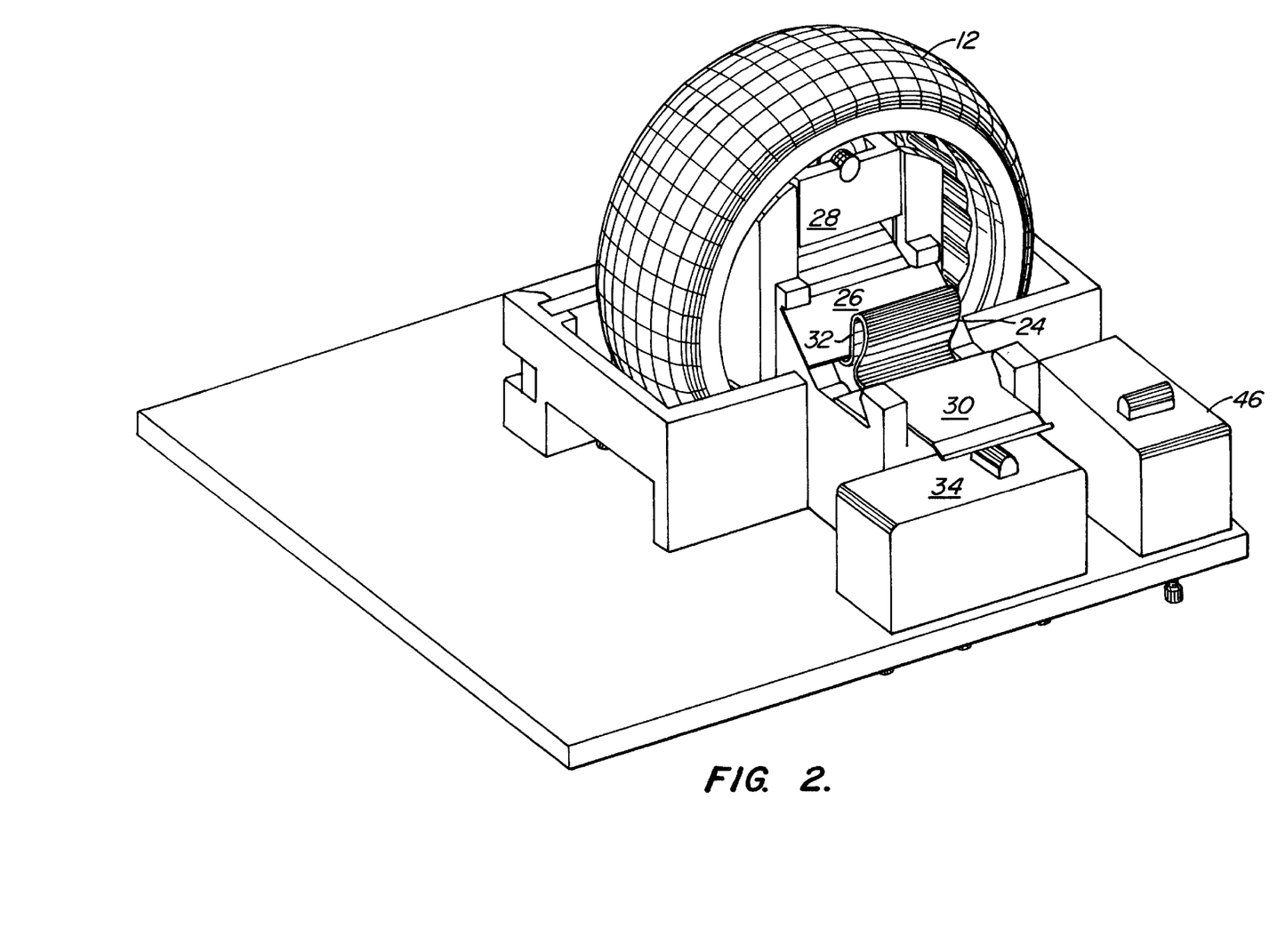
FIG. 2 is a perspective view of the opposite side of the roller of FIG. 1.

FIG. 2 shows the opposite side of roller 12 from that shown in FIG. 1. This side of roller 12 is open, with an internal mechanism for producing a ratchet effect, discussed below, as well as an attachment to a spring 24. Spring 24 connects with a first, flat portion 26 to an internal support structure 28 for roller 12. The spring contains an additional flat portion 30 over a microswitch 32, with portions 26 and 30 being joined by a curved portion 32. Portions 26 and 30 are rigid. When roller 12 is depressed, flat portion 30 will contact microswitch 32, providing an activating signal. An alternate embodiment of spring 24 is shown in FIGS. 4A–4D, discussed below. In yet another alternate embodiment, an optical switch could be used to detect the depression of the roller, with an emitter and detector positioned below the roller normally, so that they have the light path blocked when the roller is depressed. Alternately, the light beam could be interrupted by the spring or a lever, or reflective detection could be used.

Figure 3:
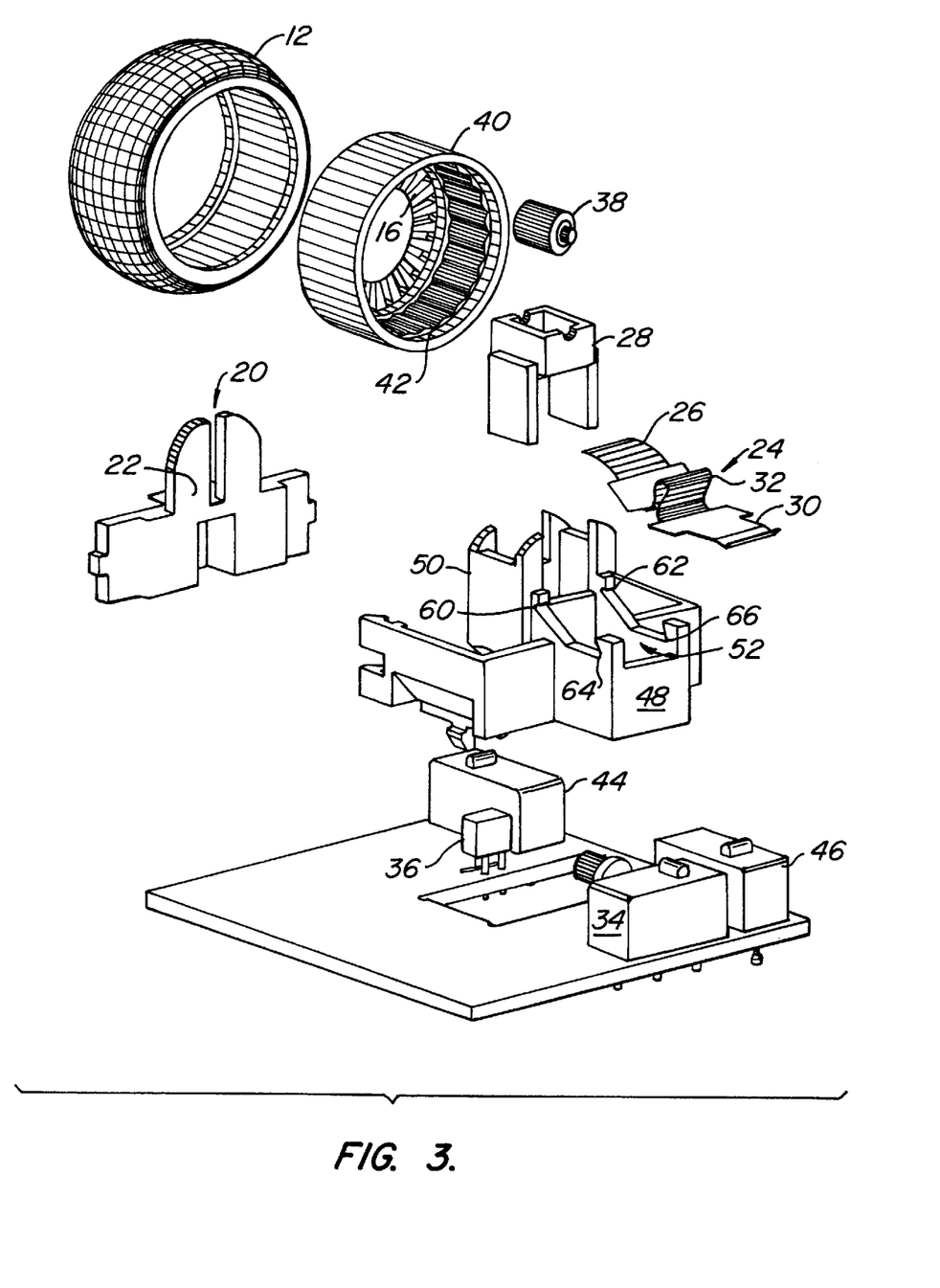
FIG. 3 is an exploded view of the roller of FIG. 2.

FIG. 3 is an exploded view from the side of FIG. 2 further illustrating the invention. As can be seen, an optical detector 36 is mounted along the vertical axis of the roller, with a corresponding photoemitter or LED 35 on the other side. Alternately, the position of the emitter and detector could be reversed, but preferably the detector is adjacent the slots so that light does not diverge as much after passing through the slots, allowing more accurate measurement. The photodetector is preferably a multiple element photodetector which provides two outputs. As for a mouse ball optical encoder, the direction of movement can be determined by which element is illuminated first, in addition to determining the amount of rotation from the number of times the detector is illuminated.

Also shown more clearly in FIG. 3 is support structure 28 which holds a second, smaller roller 38. Also shown is a ring 40 which mounts inside of roller 12 in a press fit configuration. Ring 40 is the portion including the slots 16 on one end. In addition, ring 40 includes an undulating or sawtooth-type inner surface 42. Roller 38 is biased against this undulating surface by the action of spring 24 pushing up against the bottom of housing 28 in roller 38. In addition, this mechanism is the actual support for the roller, which is pushed up against the main skeleton, portion 50, and extends through a slot in the mouse housing. Thus, when the user moves roller 12, the user feels a spring-back or ratchet-type resistance due to the spring action of roller 38, giving it the feel of a mechanical, ratchet encoder wheel, while it actually uses optical encoding for recording its position. The use of the small roller in the present invention improves the durability of the mechanism compared to prior designs which simply spring bias an element against a sawtooth surface.

Additionally, the preferred embodiment of spring 24 is designed so that the same spring not only provides the upward support for roller 12, but when roller 12 is depressed, will press downward to activate microswitch 34. This is possible through the unique use of flat portions 28 and 30 of the spring connected by a loop portion 32. Loop portion 32 is under stress, having been compressed upon assembly. The loop portion causes a downward force on flat portion 26 to cause portion 30 to also go down, rather than up. This allows an easy mounting of microswitch 34 underneath flat portion 30, with it being actuated when the roller is depressed. Flat portion 26 pivots about a pivot point at notches 60, 62. Similarly, flat portion 30 pivots about a pivot point where it contacts notches 64, 66. In operation, portion 26 will pivot upward at the end attached to loop 32, which will move that end of portion 30 up, causing the far end over switch 34 to pivot down.

Figure 4A:
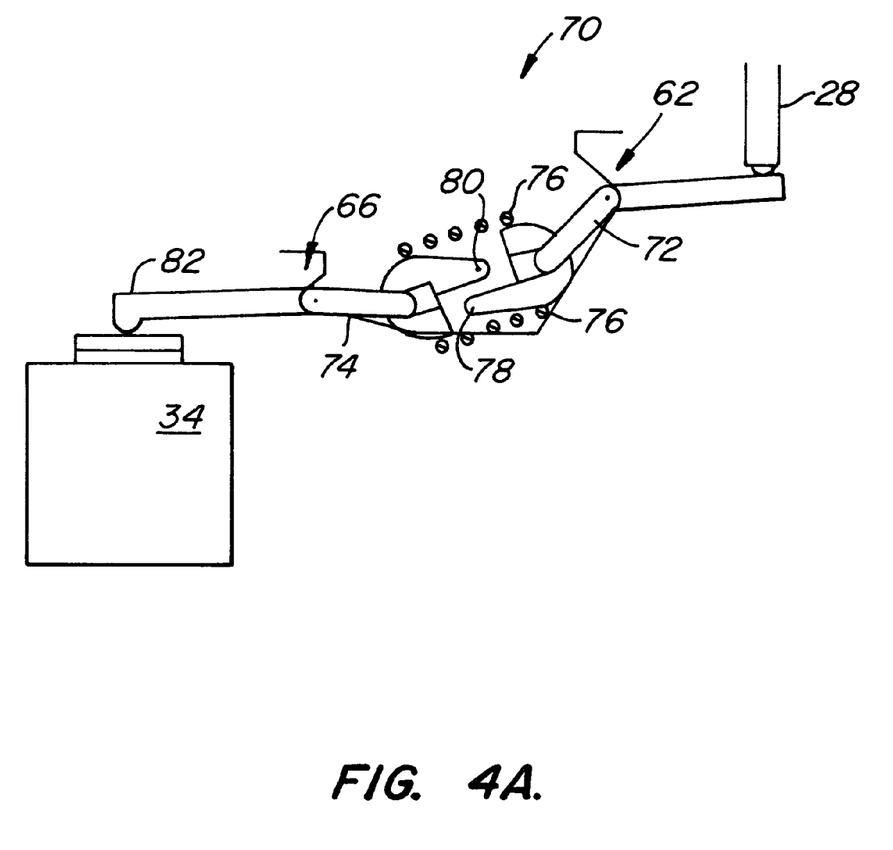
FIGS. 4A–4D illustrate a second embodiment of the spring used in the embodiments of FIGS. 1–3.
Figure 4B:
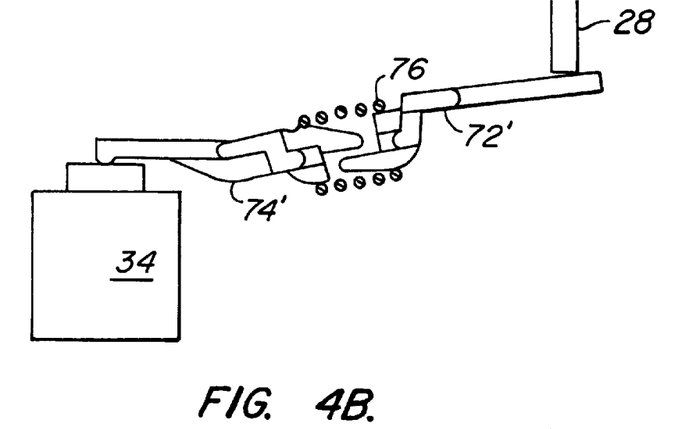
Figure 4C:
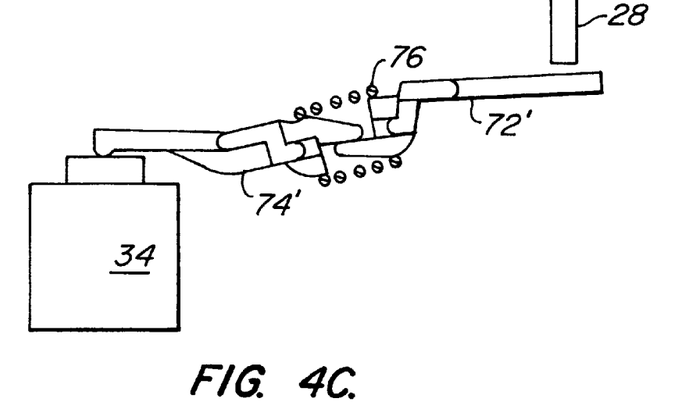
Figure 4D:
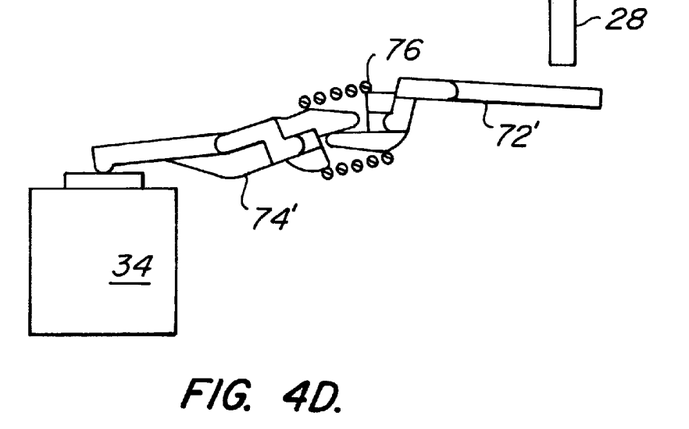

FIG. 4D illustrates an alternate embodiment of switch 24, illustrated as switch 70. A pair of arms 72, 74 are joined by a spring 76. Arms 72, 74 have ends 78, 80 which initially are not in contact. As for switch 24, described above, the downward movement on one end of arm 72 causes it to pivot about point 62, with end 78 moving up, contacting end 80, and moving end 80 up. As end 80 moves up, arm 74 pivots so far end 82 moves down to activate microswitch 34. Spring 76 is in compression, to hold the two ends together and transfer force.

FIGS. 4B–4D illustrate different positions of spring mechanism 70, with arms 72' and 74' being reinforced versions of arms 72 and 74 of FIG. 4A. FIG. 4B shows the structure 28, connected to the rachet mechanism, moving upward. FIG. 4C shows structure 28 moving down, and FIG. 4D shows the switch being activated. In one embodiment, arms 72' and 74' are plastic, and spring 76 is a commercially available coil spring, making spring mechanism 70 a low cost assembly.

Spring mechanism 70 provides adaptive feedback. Due to the use of the spring, as structure 28 is depressed, the spring will compress and pivoting will start, and as structure 28 is depressed more, a snapping action will occur to complete the movement, depressing microswitch 34. This is similar to the structure inside microswitch 34, which gives the user a noticeable feedback feel at the point where the switch has been activated.

Also shown in the figures are additional microswitches 44 and 46. These microswitches are used in an embodiment in which the mouse housing has buttons on either side of the slot through which roller extends to provide the standard clicking functions found in a typical mouse.

As shown in FIG. 3, support 22 which has slot 20 is a separate structure from a support structure 48 which partially surrounds wheel 12, and has a portion 50 which will extend inside of roller 12 to provide guides for the upward and downward movement of structure 28. In addition, a portion 52 provides a support for spring 24.

The present invention thus provides a compact design due to the combination of the hollow roller drum and the encoder disk, allowing both optical encoding and depressing of the roller for switch actuation.

As can be seen, the unique design of the roller does not include a central axis, but is rather a centerless system, allowing the ratchet-type support structure to be viable. Preferably, upon manufacturing, the optical components are held in place with a soldering fixture to guarantee their precise position. The roller mechanism is assembled separately, and inserted on the completed substrate or printed circuit board after removal of the soldering fixture.

As will be understood by those of skill in the art, the present invention can be embodied in other specific forms without departing from the spirit or essential characteristics thereof. For example, two separate springs could be used, one to support the roller and another to actuate the microswitch. Alternately, a single spring could be used to support the roller, and an extending arm could actuate the microswitch, or the microswitch could be actuated by depressing of the roller or its housing itself. In addition, different designs for the switch could be provided, such as by having two fixed, pivoting members joined by a spring so that downward movement on one end of one pivoting member cause the corresponding end of the other pivoting member to also move down. The mechanism can be incorporated into a mouse or trackball on the top or side, or the side, handle or base of a joystick.

Substrate 14 is preferably a printed circuit board (PCB), and, in some mouse designs, could be mounted at an angle to match the inclined surface of the mouse through which it protrudes. In addition, roller 12 may optionally be made of a rubber material, which is press-fitted across internal ring 40 of FIG. 3. The rubber material may have ridges along its outer surface to give additional tactile feedback to the user, and to improve the friction of the user's finger when rotating the roller.

In one alternate embodiment, instead of slits, the roller can have reflective and nonreflective strips, with the emitter and detector being mounted on the same side of the roller. Preferably, the emitter and detector are mounted side by side, and a multiple element detector is used. The strips can be shaped in the same manner as the slits of the embodiment of FIG. 1.

The present invention as shown in the figures is mounted in one embodiment in a mouse housing, such as housing 92 of the prior art mouse of FIG. 5. The roller extends through an opening in the mouse, such as the roller 90 shown in FIG. 5.

Accordingly, the foregoing disclosure is intended to be illustrative, but not limiting, of the scope of the invention which is set forth in the following claims.

What is claimed is:

1. A pointing device for a computer comprising:

a housing;

a user-movable roller extending from said housing, said roller having a a plurality of slits, said roller being mounted to both rotate about its axis, and to be depressed;

a photoemitter mounted on a first side of said roller to direct light through said slits in said roller;

a photodetector mounted on a second side of said roller, opposite said photoemitter, to detect light from said photoemitter passing through said slits in said roller;

a support structure for said roller, said support structure being connected to said housing, said support structure being configured to maintain the directing of light through said roller by said photoemitter, and the detecting of light passing through said roller by said photodetector, such that said photoemitter and photodetector maintain alignment with said slits of said roller when said roller is depressed; and a switch mounted to be actuated when said roller is depressed.

2. The pointing device of claim 1 further comprising:

a spring biased against said roller, to produce a ratcheting movement of said roller to provide tactile user feedback.

3. The pointing device of claim 2 wherein said roller has an undulating inside surface, and further comprising:

a second roller, mounted inside said first roller, said second roller being spring biased against said undulating inside surface.

4. The pointing device of claim 3 further comprising:

an axle support structure for supporting ends of said second roller; and a spring biasing said axle support structure against said undulating inside surface.

5. The pointing device of claim 1 further comprising:

a member extending from said support structure to said switch, said member being configured to activate said switch when said roller is depressed.

6. The pointing device of claim 5 wherein said slits on said roller extend in a generally radial direction, and said photoemitter and photodectector are mounted aligned with said slits so that the slits will stay aligned with said photo emitter and photodetector as said roller is depressed.

7. The pointing device of claim 5 wherein said member comprises a spring.

8. The pointing device of claim 7 wherein said spring is configured to both bias said support structure against said roller, and to activate said switch when said roller is depressed.

9. The pointing device of claim 8 wherein said spring comprises:

a first pivoting member supporting said support structure;

a second pivoting member positioned over said switch; and a spring joining said first and second members, such that when said first member is depressed, said second member will pivot downward to activate said switch.

10. The pointing device of claim 1 wherein said pointing device is a mouse.

11. The pointing device of claim 1 wherein said pointing device is a trackball.

12. The pointing device of claim 1 wherein said pointing device is a joystick.

13. A mouse for a computer comprising:

a housing;

a user-movable roller extending from said housing, said roller having a plurality of slits;

a photoemitter mounted on one side of said roller for directing light through said slits;

a photodetector mounted on a second side of said roller opposite said photoemitter;

a ratchet structure coupled to said roller to produce a ratcheting movement of said roller to provide tactile user feedback;

a support structure for said roller configured to allow said roller to be depressed, said support structure being connected to said housing, said support structure being configured to maintain the directing of light through said roller by said photoemitter, and the detecting of light passing through said roller by said photodetector, such that said photoemitter and photodetector maintain alignment with said slits of said roller when said roller is depressed;

a switch; and a member extending from said support structure to said switch, said member being configured to activate said switch by the depression of said roller.

14. The pointing device of claim 13 wherein said roller has an undulating inside surface, and said rachet structure and said support structure both include the same second roller, mounted inside said first roller, said second roller being spring biased against said undulating inside surface.

\* \* \* \* \*

UNITED STATES PATENT AND TRADEMARK OFFICE
CERTIFICATE OF CORRECTION

PATENT NO.   : 6,157,369
DATED        : December 5, 2000
INVENTOR(S)  : Antoine A. Merminod, Marc A. Bidiville, and Ting Hu Chang It is certified that error appears in the above-identified patent and that said Letters Patent is hereby corrected as shown below:

<u>Title page,</u>
Item [75], should read -- Antoine A. Merminod, Cully, Switzerland
Marc A. Bidiville, Pully, Switzerland
Alain Wegmann, Lausanne, Switzerland --.

Signed and Sealed this

First Day of April, 2003

JAMES E. ROGAN
*Director of the United States Patent and Trademark Office*